US012008944B2

(12) United States Patent
Baek et al.

(10) Patent No.: US 12,008,944 B2
(45) Date of Patent: Jun. 11, 2024

(54) DISPLAY PANEL DRIVER AND METHOD OF DRIVING A DISPLAY PANEL USING THE DISPLAY PANEL DRIVER FOR IMPROVING DISPLAY QUALITY

(71) Applicant: Samsung Display Co., LTD., Yongin-si (KR)

(72) Inventors: Sung-Yeol Baek, Yongin-si (KR); Inbok Song, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/199,093

(22) Filed: May 18, 2023

(65) Prior Publication Data

US 2024/0096260 A1 Mar. 21, 2024

(30) Foreign Application Priority Data

Sep. 15, 2022 (KR) ........................ 10-2022-0116661

(51) Int. Cl.
*G09G 3/30* (2006.01)
*G09G 3/20* (2006.01)
*G09G 3/36* (2006.01)

(52) U.S. Cl.
CPC ... *G09G 3/2092* (2013.01); *G09G 2310/0275* (2013.01); *G09G 2320/0233* (2013.01); *G09G 2320/0242* (2013.01); *G09G 2320/0271* (2013.01); *G09G 2330/021* (2013.01); *G09G 2360/14* (2013.01)

(58) Field of Classification Search
CPC ......... G09G 3/2092; G09G 2320/0233; G09G 2320/0242; G09G 2320/0271
See application file for complete search history.

(56) References Cited

U.S. PATENT DOCUMENTS

2008/0180430 A1* 7/2008 Eriguchi ............. G09G 3/3648 345/212
2015/0070377 A1* 3/2015 Matsui ..................... H04N 9/73 345/589
2021/0049966 A1* 2/2021 Hsu ...................... G09G 3/3258

FOREIGN PATENT DOCUMENTS

KR 101840796 B1 3/2018
KR 102139693 B1 7/2020
KR 1020210043046 A 4/2021
KR 1020220063032 A 5/2022

* cited by examiner

*Primary Examiner* — Sanghyuk Park
(74) *Attorney, Agent, or Firm* — CANTOR COLBURN LLP

(57) ABSTRACT

A display panel driver includes: a driving controller receiving input image data and converting the input image data into a data signal and a data driver converting the data signal into a data voltage. The driving controller includes a plurality of lookup tables storing data signal values corresponding to grayscale values of the input image data based on an input maximum luminance, and a total number of the data signal values stored in a first lookup table corresponding to a first input maximum luminance is different from a total number of the data signal values stored in a second lookup table corresponding to a second input maximum luminance.

20 Claims, 12 Drawing Sheets

DISPLAY PANEL DRIVER AND METHOD OF DRIVING A DISPLAY PANEL USING THE DISPLAY PANEL DRIVER FOR IMPROVING DISPLAY QUALITY

This application claims priority to Korean Patent Application No. 10-2022-0116661, filed on Sep. 15, 2022, and all the benefits accruing therefrom under 35 U.S.C. § 119, the content of which in its entirety is herein incorporated by reference.

BACKGROUND

1. Field

The present invention relates to a display panel driver and a method of driving a display panel using the same. More particularly, the present invention relates to a display panel driver and a method of driving a display panel using the display panel driver improving display quality of the display panel.

2. Description of the Related Art

Generally, a display device includes a display panel and a display panel driver. The display panel displays an image based on an input image data, and includes gate lines, data lines, and pixels. The display panel driver includes a gate driver providing gate signals to the gate lines, a data driver providing data voltages to the data lines, a driving controller controlling the gate driver and the data driver, and a gamma reference voltage generator providing a gamma reference voltage to the data driver.

The driving controller may output data signals corresponding to a grayscale of the input image data, and may use a lookup table storing the data signal values corresponding to the grayscale values of the input image data.

When a maximum input luminance is low or the input image data includes a low grayscale, a user may easily recognize a difference of a luminance. Therefore when an error in luminance and color coordinates occurs due to an interpolation in a low luminance or low grayscale, the error may be easily recognized by the user.

A conventional display panel driver increases the number of the data signal values stored in the lookup table regardless of a maximum input luminance and the grayscale, thereby solving a problem in which the user easily recognizes the error in the luminance and the color coordinates. However, when the number of the data signal values stored in the lookup table are increased regardless of the maximum input luminance and the grayscale, a size of a driving chip and a power consumption of the driving chip may increase. Therefore, a method of increasing the number of the data signal values stored in the lookup table has a limitation in terms of an area and the power consumption of the display device.

SUMMARY

Embodiments of the present invention provide a display panel driver using lookup tables in which the number of stored data signal values is different according to a maximum input luminance. a method of driving a display panel using the same Embodiments of the present invention provide a method of driving a display panel using a display panel driver using lookup tables in which the number of stored data signal values is different according to a maximum input luminance.

In an embodiment of a display panel driver according to the present invention, the display panel driver includes: a driving controller configured to receive input image data and to convert the input image data into a data signal and a data driver configured to convert the data signal into a data voltage. The driving controller includes a plurality of lookup tables storing data signal values corresponding to grayscale values of the input image data based on an input maximum luminance, and a total number of the data signal values stored in a first lookup table corresponding to a first input maximum luminance is different from a total number of the data signal values stored in a second lookup table corresponding to a second input maximum luminance.

In an embodiment, the lookup tables may be divided into a first luminance group, a second luminance group, and a third luminance group according to the input maximum luminance, the input maximum luminance of the first luminance group may be lower than the input maximum luminance of the second luminance group, and the input maximum luminance of the second luminance group may be lower than the input maximum luminance of the third luminance group, each of the lookup tables of the first luminance group may have a greater number of the data signal values than each of the lookup tables of the second luminance group, and each of the lookup tables of the second luminance group may have a greater number of the data signal values than each of the lookup tables of the third luminance group.

In an embodiment, the lookup tables may be divided into a first luminance group, a second luminance group, and a third luminance group according to the input maximum luminance, the input maximum luminance of the first luminance group may be lower than the input maximum luminance of the second luminance group, and the input maximum luminance of the second luminance group may be lower than the input maximum luminance of the third luminance group, and each of the lookup tables of the first luminance group may have a greater number of the data signal values than each of the lookup tables of the second luminance group and the third luminance group.

In an embodiment, the input maximum luminance may be manually set by a user or automatically set using an illuminance sensor.

In an embodiment, when a certain lookup table corresponding to the input maximum luminance is absent from the driving controller, the driving controller may generate a compensation lookup table corresponding to the certain lookup table by linearly interpolating the data signal values stored in two lookup tables adjacent to the input maximum luminance among the lookup tables.

In an embodiment, the lookup tables may be divided into a first luminance group, a second luminance group, and a third luminance group according to the input maximum luminance, the input maximum luminance of the first luminance group may be lower than the input maximum luminance of the second luminance group, and the input maximum luminance of the second luminance group may be lower than the input maximum luminance of the third luminance group, each of grayscale values of each of the lookup tables of the first luminance group may be represented by P bits, each of grayscale values of each of the lookup tables of the second luminance group may be represented by Q bits, each of grayscale values of each of the lookup tables of the third luminance group may be represented by R bits, P, Q, and R may be natural numbers, and at least two of the P bits, the Q bits, and the R bits may be different from each other.

In an embodiment, the P bits are greater than the R bits and the Q bits may be greater than the R bits.

In an embodiment, the P bits may be greater than the Q bits and the P bits may be greater than the R bits.

In an embodiment, each of the lookup tables may be divided into a first grayscale group having a first grayscale interval, a second grayscale group having a second grayscale interval, and a third grayscale group having a third grayscale interval according to the grayscale values of the input image data, and at least two of the first grayscale interval, the second grayscale interval, and the third grayscale interval may be different from each other.

In an embodiment, each of grayscale values of the second grayscale group may be greater than each of grayscale values of the first grayscale group, and each of grayscale values of the third grayscale group may be greater than each of the grayscale values of the second grayscale group, and the first grayscale interval may be smaller than the second grayscale interval, and the second grayscale interval may be smaller than the third grayscale interval.

In an embodiment, the lookup tables may be divided into a first frequency group, a second frequency group, and a third frequency group according to a driving frequency for the display panel driver, the driving frequency of the first frequency group may be smaller than the driving frequency of the second frequency group, the driving frequency of the second frequency group may be smaller than the driving frequency of the third frequency group, and numbers of the data signal values of at least two of the first frequency group, the second frequency group, and the third frequency group may be different from each other.

In an embodiment, each of the lookup tables of the first frequency group may have a total number of the data signal values different from a total number of the data signal values of each of the lookup tables of the second frequency group and the third frequency group.

In an embodiment, each of the lookup tables of the second frequency group may have a total number of the data signal values different from a total number of the data signal values of each of the lookup tables of the first frequency group and the third frequency group.

In an embodiment, each of the lookup tables of the third frequency group may have a total number of the data signal values different from a total number of the data signal values of each of the lookup tables of the first frequency group and the second frequency group.

In an embodiment of a method of driving a display panel using a display panel driver according to the present invention, the method includes: selecting one, based on an input maximum luminance, among a plurality of lookup tables in which data signal values corresponding to gray scale values of input image data are stored based on the input maximum luminance, converting the input image data into a data signal using the selected one of the lookup tables, converting the data signal into a data voltage, and outputting the data voltage to a display panel. A total number of the data signal values of a first lookup table corresponding to a first input maximum luminance is different from a total number of the data signal values of a second lookup table corresponding to a second input maximum luminance.

In an embodiment, the lookup tables may be divided into a first luminance group, a second luminance group, and a third luminance group according to the input maximum luminance, the input maximum luminance of the first luminance group may be lower than the input maximum luminance of the second luminance group, and the input maximum luminance of the second luminance group may be lower than the input maximum luminance of the third luminance group, each of the lookup tables of the first luminance group may have a greater number of the data signal values than each of the lookup tables of the second luminance group, and each of the lookup tables of the second luminance group may have a greater number of the data signal values than each of the lookup tables of the third luminance group.

In an embodiment, when a certain lookup table corresponding to the input maximum luminance is absent from the driving controller, the driving controller may generate a compensation lookup table corresponding to the certain lookup table by linearly interpolating the data signal values stored in two lookup tables adjacent to the input maximum luminance among the lookup tables.

In an embodiment, the lookup tables may be divided into a first luminance group, a second luminance group, and a third luminance group according to the input maximum luminance, the input maximum luminance of the first luminance group may be lower than the input maximum luminance of the second luminance group, and the input maximum luminance of the second luminance group may be lower than the input maximum luminance of the third luminance group, each of grayscale values of each of the lookup tables of the first luminance group may be represented by P bits, each of grayscale values of each of the lookup tables of the second luminance group may be represented by Q bits, each of grayscale values of each of the lookup tables of the third luminance group may be represented by R bits, P, Q, and R may be natural numbers, and at least two of the P bits, the Q bits, and the R bits may be different from each other.

In an embodiment, each of the lookup tables may be divided into a first grayscale group having a first grayscale interval, a second grayscale group having a second grayscale interval, and a third grayscale group having a third grayscale interval according to the grayscale values of the input image data, and at least two of the first grayscale interval, the second grayscale interval, and the third grayscale interval may be different from each other.

In an embodiment, the lookup tables may be divided into a first frequency group, a second frequency group, and a third frequency group according to a driving frequency for the display panel driver, the driving frequency of the first frequency group may be smaller than the driving frequency of the second frequency group, the driving frequency of the second frequency group may be smaller than the driving frequency of the third frequency group, and numbers of the data signal values of at least two of the first frequency group, the second frequency group, and the third frequency group may be different from each other.

According to the display device and the method of driving the display device, the display device and the method of driving the display device may classify the lookup tables storing the data signal values corresponding to the grayscale values of the input image data into the first luminance group, the second luminance group, and the third group according to the maximum input luminance. Each of the lookup tables of at least two of the first luminance group, the second luminance group, and the third luminance group may have different number of the data signal values. Accordingly, a luminance error may not be easily recognized by the user in a section where the maximum input luminance or the grayscale value of the input image data is small. In addition, the area and power consumption of the display panel driver may be effectively reduced.

However, the effects of the present invention are not limited to the above-described effects, and may be variously expanded without departing from the spirit and scope of the present invention.

BRIEF DESCRIPTION OF THE DRAWINGS

The above and other features and advantages of the present invention will become more apparent by describing in detailed embodiments thereof with reference to the accompanying drawings, in which.

DETAILED DESCRIPTION

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Hereinafter, the present invention will be explained in detail with reference to the accompanying drawings.

Figure 1:
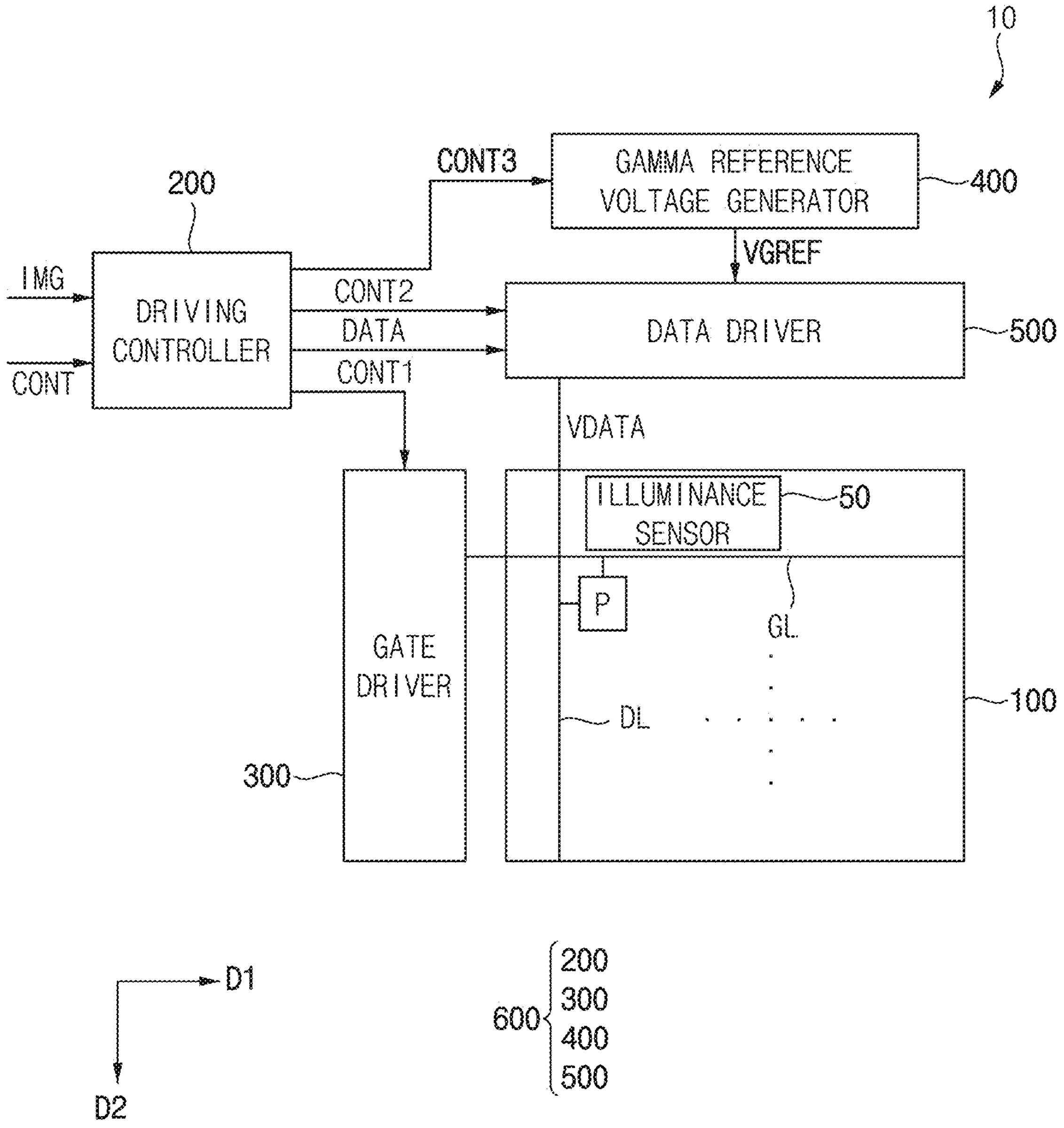
FIG. 1 is a block diagram illustrating a display device according to an embodiment of the present invention.

FIG. 1 is a block diagram illustrating a display device 10 according to an embodiment of the present invention.

Referring to FIG. 1, the display device 10 may include a display panel 100 and a display panel driver 600. The display panel driver 600 may include a driving controller 200, a gate driver 300, a gamma reference voltage generator 400 and a data driver 500.

For example, the driving controller 200 and the data driver 500 may be integrally formed. For example, the driving controller 200, the gamma reference voltage generator 400, and the data driver 500 may be integrally formed. A driving module including at least the driving controller 200 and the data driver 500 which are integrally formed may be called to a timing controller embedded data driver ("TED").

The display panel 100 includes a display region on which an image is displayed and a peripheral region adjacent to the display region.

For example, the display panel 100 may be an organic light emitting diode display panel including an organic light emitting diode. For example, the display panel 100 may be a quantum-dot organic light emitting diode display panel including an organic light emitting diode and a quantum-dot color filter. For example, the display panel 100 may be a quantum-dot nano light emitting diode display panel including a nano light emitting diode and a quantum-dot color filter. For example, the display panel 100 may be a liquid crystal display panel including a liquid crystal layer.

The display panel 100 may include gate lines GL, data lines DL, and pixels P electrically connected to the gate lines GL and the data lines DL. The gate lines GL may extend in a first direction D1, and the data lines DL extend in a second direction D2 crossing the first direction D1.

The driving controller 200 may receive input image data IMG and the input control signal CONT from an external device (not shown). For example, the input image data IMG may include red image data, green image data, and blue image data. The input image data IMG may include white image data. The input image data IMG may include magenta image data, yellow image data, and cyan image data. The input control signal CONT may include a master clock signal and a data enable signal. The input control signal CONT may further include a vertical synchronization signal and a horizontal synchronization signal.

The driving controller 200 may generate a first control signal CONT1, a second control signal CONT2, a third control signal CONT3 and a data signal DATA based on the input image data IMG and the input control signal CONT.

The driving controller 200 may generate the first control signal CONT1 for controlling an operation of the gate driver 300 based on the input control signal CONT, and output the first control signal CONT1 to the gate driver 300. The first control signal CONT1 may include a vertical start signal and a gate clock signal.

The driving controller 200 may generate the second control signal CONT2 for controlling an operation of the data driver 500 based on the input control signal CONT, and output the second control signal CONT2 to the data driver 500. The second control signal CONT2 may include a horizontal start signal and a load signal.

The driving controller 200 may generate the data signal DATA based on the input image data IMG. The driving controller 200 may output the data signal DATA to the data driver 500. The drive controller 200 may generate the third control signal CONT3 for controlling the operation of the gamma reference voltage generator 400 based on the input control signal CONT and output the third control signal CONT3 to the gamma reference voltage generator 400.

The gate driver 300 may generate gate signals for driving the gate lines GL in response to the first control signal CONT1 received from the driving controller 200. The gate driver 300 may output gate signals to the gate lines GL. For example, the gate driver 300 may sequentially output the gate signals to the gate lines GL.

In an embodiment, the gate driver 300 may be integrated on the peripheral region of the display panel 100.

The gamma reference voltage generator 400 may generate a gamma reference voltage VGREF in response to the third control signal CONT3 received from the driving controller 200. The gamma reference voltage generator 400 may provide the gamma reference voltage VGREF to the data driver 500. The gamma reference voltage VGREF may have a value corresponding to the data signal DATA.

In an embodiment, the gamma reference voltage generator 400 may be disposed in the driving controller 200 or in the data driver 500.

The data driver 500 may receive the second control signal CONT2 and the data signal DATA from the driving controller 200, and receive the gamma reference voltage VGREF from the gamma reference voltage generator 400. The data driver 500 may convert the data signal DATA into an analog data voltage VDATA using the gamma reference voltage VGREF. The data driver 500 may output the data voltage VDATA to the data line DL.

Figure 2:
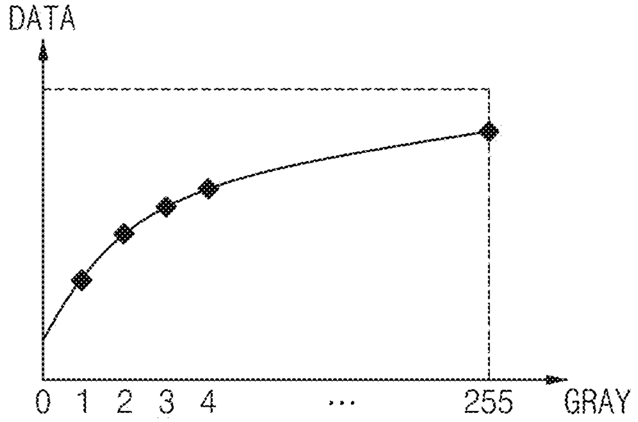
FIG. 2 is a graph illustrating the relationship between grayscale values of input image data and data signal values.

FIG. 2 is a graph illustrating the relationship between grayscale values of input image data and data signal values.

Referring to FIGS. 1 and 2, the driving controller 200 may receive input image data IMG and convert the input image data IMG into a data signal DATA.

For example, the input image data IMG may include a grayscale value. The grayscale value may have 256 grayscales (grayscales 0 to 255). Grayscale 0 of the input image data IMG may signify a black grayscale. The grayscale value is not limited to grayscales 0 to 255.

In FIG. 2, grayscale 0 may indicate that the grayscale value is the smallest. At this point, the data signal value DATA may be the smallest, and the luminance may be the lowest. The grayscale value of grayscale 4 may be greater than grayscale 0. At this point, the data signal value DATA may be greater than the data signal value DATA of grayscale 0, and the luminance may be higher than the luminance of 0 grayscale. Grayscale 255 may represent that the grayscale value is the greatest. At this point, the data signal value DATA may be the greatest, and the luminance may be a maximum luminance. Accordingly, the data signal value DATA may increase as the grayscale value increases.

The maximum luminance may be a luminance corresponding to the maximum grayscale. For example, when the input image data IMG may include 256 grayscales (grayscales 0 to 255), the maximum luminance may be a luminance corresponding to grayscale 255.

Figure 3:
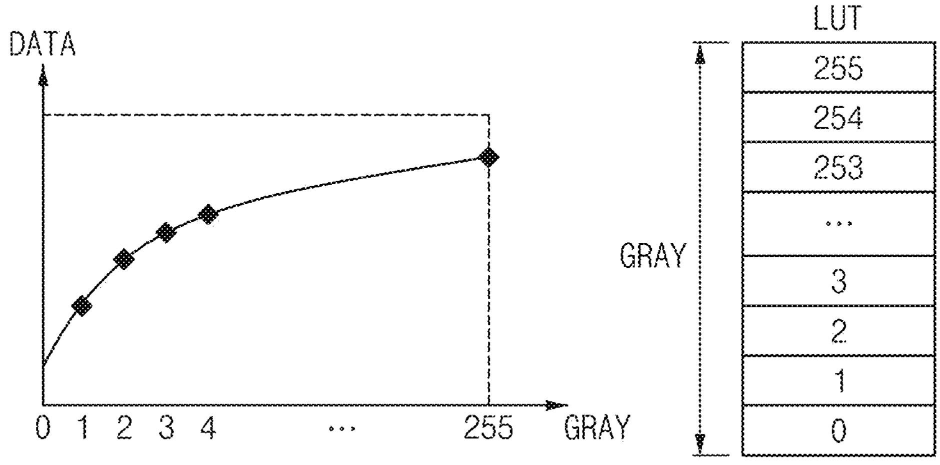
FIG. 3 is a diagram illustrating the relationship between the graph of FIG. 2 and lookup tables included in the driving controller of FIG. 1.

FIG. 3 is a diagram illustrating the relationship between the graph of FIG. 2 and lookup tables included in the driving controller of FIG. 1.

Referring to FIGS. 1 to 3, the driving controller 200 may output a data signal DATA corresponding to the grayscale of the input image data IMG, may use a lookup table LUT in which the data signal values DATA corresponding to grayscale values of the input image data IMG are stored to improve output speed of the data signals DATA.

Although the present invention has been described that the lookup tables LUT are included in the driving controller 200, the present invention may not be limited thereto. For another example, the lookup tables LUT may be included in the data driver 500. At this point, the lookup tables LUT may store data voltage values VDATA corresponding to the grayscale values of the input image data IMG.

Figure 4:
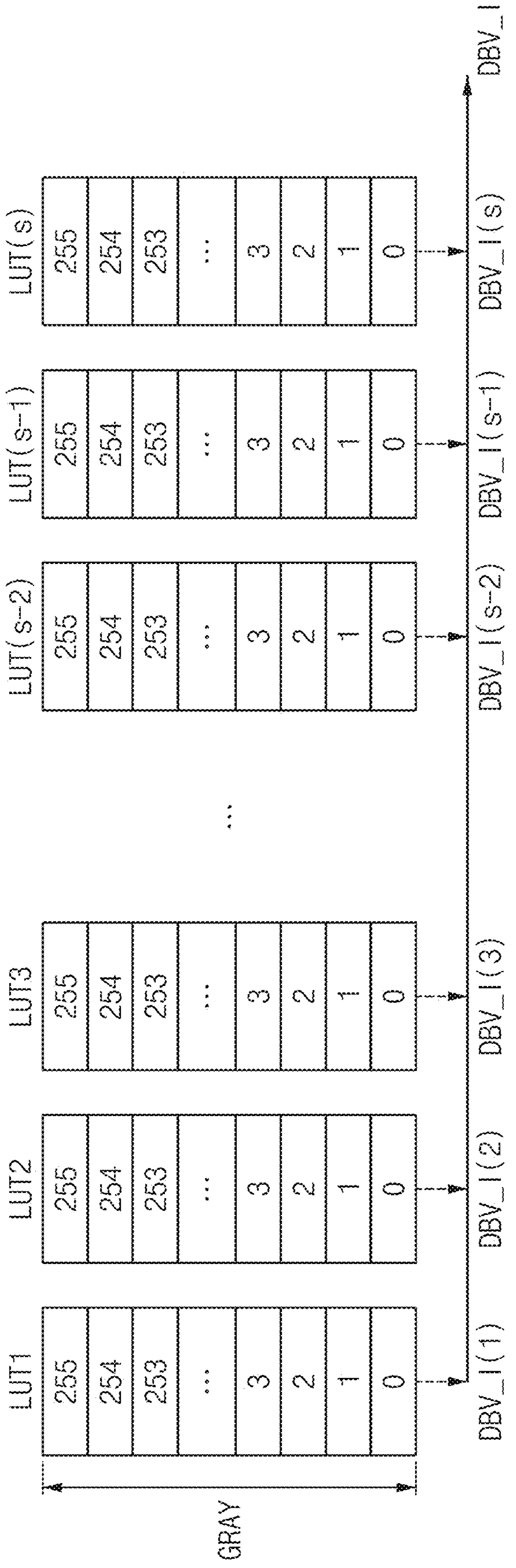
FIG. 4 is a diagram illustrating an example of lookup tables of FIG. 3 according to an input maximum luminance.
Figure 5:
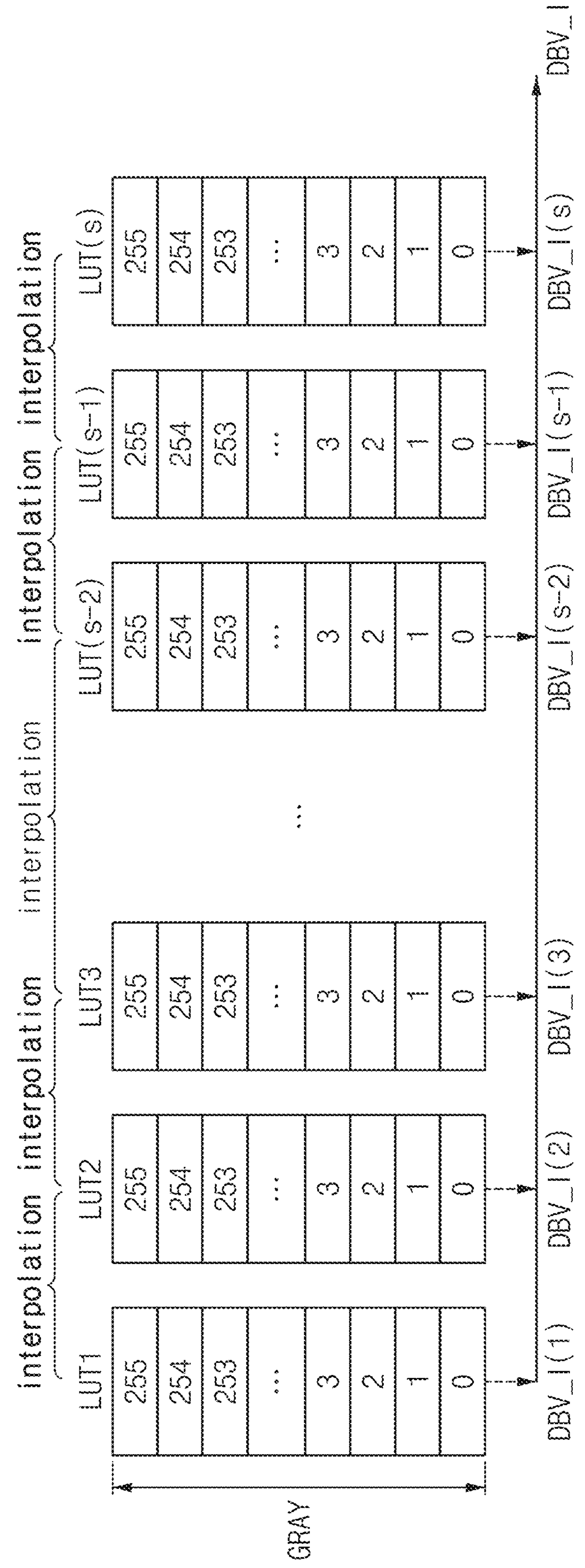
FIG. 5 is a diagram illustrating an example explaining operations in which data signal values of the lookup tables of FIG. 4 are linearly interpolated.
Figure 6:
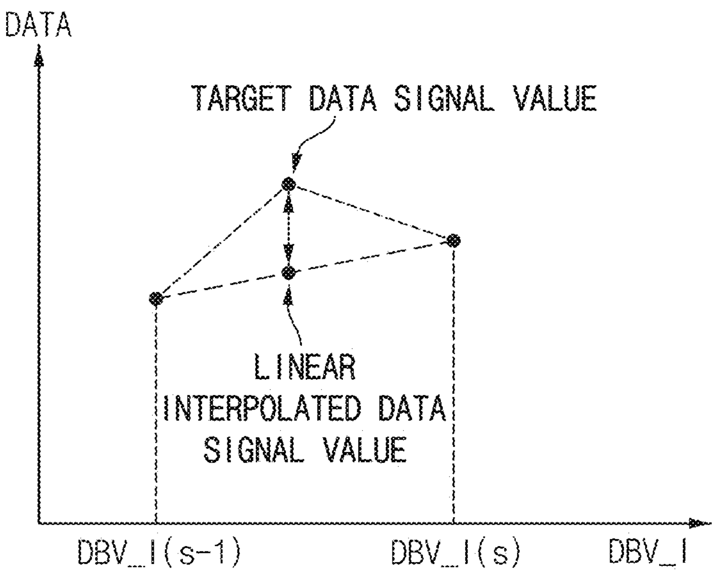
FIG. 6 is a diagram illustrating an example of an error between the linearly interpolated data signal value of FIG. 5 and a target data signal value.
Figure 7:
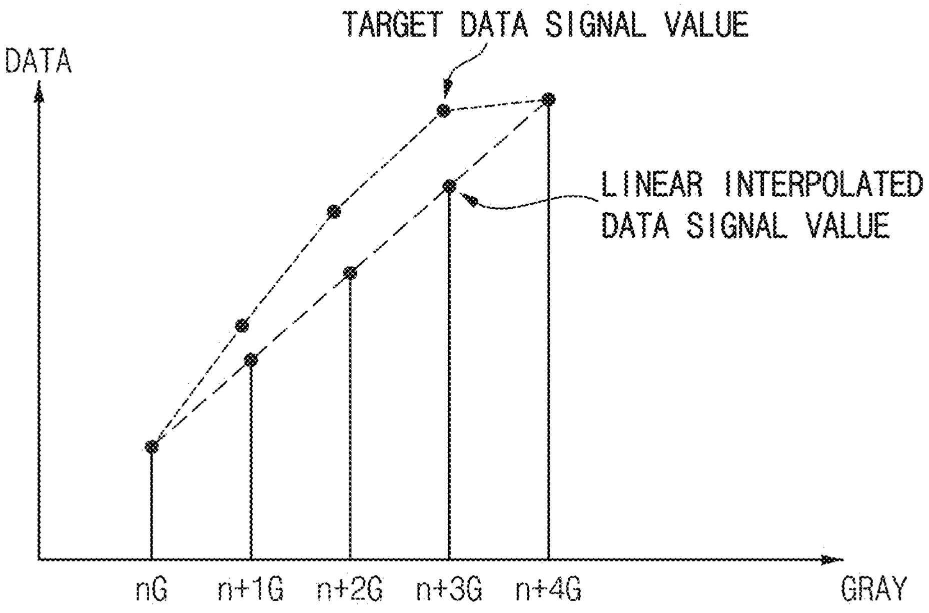
FIG. 7 is a diagram illustrating an example of an error between the linearly interpolated data signal value of FIG. 5 and a target data signal value.

FIG. 4 is a diagram illustrating an example of lookup tables of FIG. 3 according to an input maximum luminance. FIG. 5 is a diagram illustrating an example for explaining operations in which data signal values of the lookup tables of FIG. 4 are linearly interpolated. FIG. 6 is a diagram illustrating an example of an error between the linearly interpolated data signal value of FIG. 5 and a target data signal value. FIG. 7 is a diagram illustrating an example of an error between the linearly interpolated data signal value of FIG. 5 and a target data signal value.

Referring to FIG. 4, the driving controller 200 may include the lookup tables LUT storing the data signal values DATA corresponding to the grayscale values of the input image data IMG based on an input maximum luminance DBV_I.

The input maximum luminance DBV_I may be manually set by a user or automatically set by using an illuminance sensor 50 disposed in the display device 10. The input maximum luminance DBV_I may be a luminance corresponding to the maximum grayscale. For example, when the input maximum luminance DBV_I is 1000 nits, 1000 nits may be the luminance corresponding to the maximum grayscale.

The lookup tables LUT may be set based on the input maximum luminance DBV_I at regular intervals.

For example, one of the lookup tables LUT may be set based on the input maximum luminance DBV_I of 10 nits, another one of the lookup tables LUT may be set based on the input maximum luminance DBV_I of 20 nits, and the other one of the lookup tables LUT may be set based on the input maximum luminance DBV_I of 30 nits. The lookup tables LUT may be set at the input maximum luminance DBV_I interval of 10 nits. In addition, although the present invention has been described that the lookup tables LUT are set at the input maximum luminance DBV_I interval of 10 nits, the present invention is not limited thereto. For another example, the lookup tables LUT may be set to an input maximum luminance DBV_I interval of less than 10 nits or greater than 10 nits.

The driving controller 200 may convert a grayscale of the input image data IMG into the data signal DATA by using any one of the lookup tables LUT based on the input maximum luminance DBV_I.

Referring to FIG. 5, the lookup table LUT corresponding to the input maximum luminance DBV_I may not be present. In this case, the driving controller 200 may generate a compensation lookup table by linearly interpolating data signal values DATA stored in two lookup tables LUT among lookup tables LUT.

Specifically, when the lookup table LUT corresponding to the input maximum luminance DBV_I is not present, the driving controller 200 may generate a compensation lookup table by selecting two lookup tables LUT adjacent to the input maximum luminance DBV_I, and linearly interpolating the data signal values DATA stored in the two lookup tables LUT. The compensation lookup table may have the same number (e.g., 256) of data signal values DATA as each of the two lookup tables LUT.

For example, when the input maximum luminance DBV_I is 15 nits, the driving controller 200 may select a lookup table LUT based on an input maximum luminance DBV_I of 10 nits and a lookup table LUT based on an input maximum luminance DBV_I of 20 nits, and linearly interpolate data signal values DATA stored in the lookup table LUT based on the input maximum luminance DBV_I of 10 nits and the lookup table LUT based on the input maximum luminance DBV_I of 20 nits, so that a compensation lookup table based on an input maximum luminance DBV_I of 15 nits may be generated. The compensation lookup table based on the input maximum luminance DBV_I of 15 nits may have the same number (e.g., 256) of data signal values DATA as each of the lookup table LUT based on the input maximum luminance DBV_I of 10 nits and the lookup table LUT based on the input maximum luminance DBV_I of 20 nits.

Referring to FIG. 6, when the lookup table LUT corresponding to the input maximum luminance DBV_I is not present, the driving controller 200 may generate the compensation lookup table by linearly interpolating the data signal values DATA stored in the two lookup tables LUT, and accordingly, the linearly interpolated data signal values of the compensation lookup table may be different from target data signal values.

The target data signal value may be a target data signal value required for a grayscale of an input image data IMG of a compensation lookup table.

Referring to FIG. 7, the lookup table LUT may not have data signal values DATA for all grayscales of the input image data IMG. For example, the lookup table LUT may have data signal values DATA for grayscale n and grayscale n+4, however, may not have data signal values DATA for grayscale n+1, grayscale n+2, and grayscale n+3. The driving controller 200 may linearly interpolate a data signal value corresponding to grayscale n and a data signal value corresponding to grayscale n+4 in order to obtain data signal values corresponding to grayscale n+1, grayscale n+2, and grayscale n+3. Accordingly, the data signal values DATA corresponding to the linearly interpolated grayscale n+1, gray scale n+2, and grayscale n+3 may be different from the target data signal values.

When the input maximum luminance DBV_I is low or when the grayscale of the input image data IMG is a low, the user may easily recognize a difference in the luminance. When the input maximum luminance DBV_I is low, a maximum luminance of an image is low, so the luminance may be low as a whole. When the input image data IMG is a low grayscale, the luminance corresponding to the grayscale may be low. When the luminance is low, the user may easily recognize the difference in luminance. Accordingly, when the input maximum luminance DBV_I is low or when the input image data IMG is a low grayscale, there may be a problem in that the user may easily recognize an error between an actual luminance and a target luminance due to the linear interpolation.

In order to solve the problem, when the number of the data signal values DATA stored in the lookup tables LUT simply increases regardless of the input maximum luminance DBV_I and the grayscale, the problem in that the user easily recognizes the luminance error may be solved. However, the above solution has a limitation in an aspect of area and power consumption of a display panel driver 600.

Figure 8:
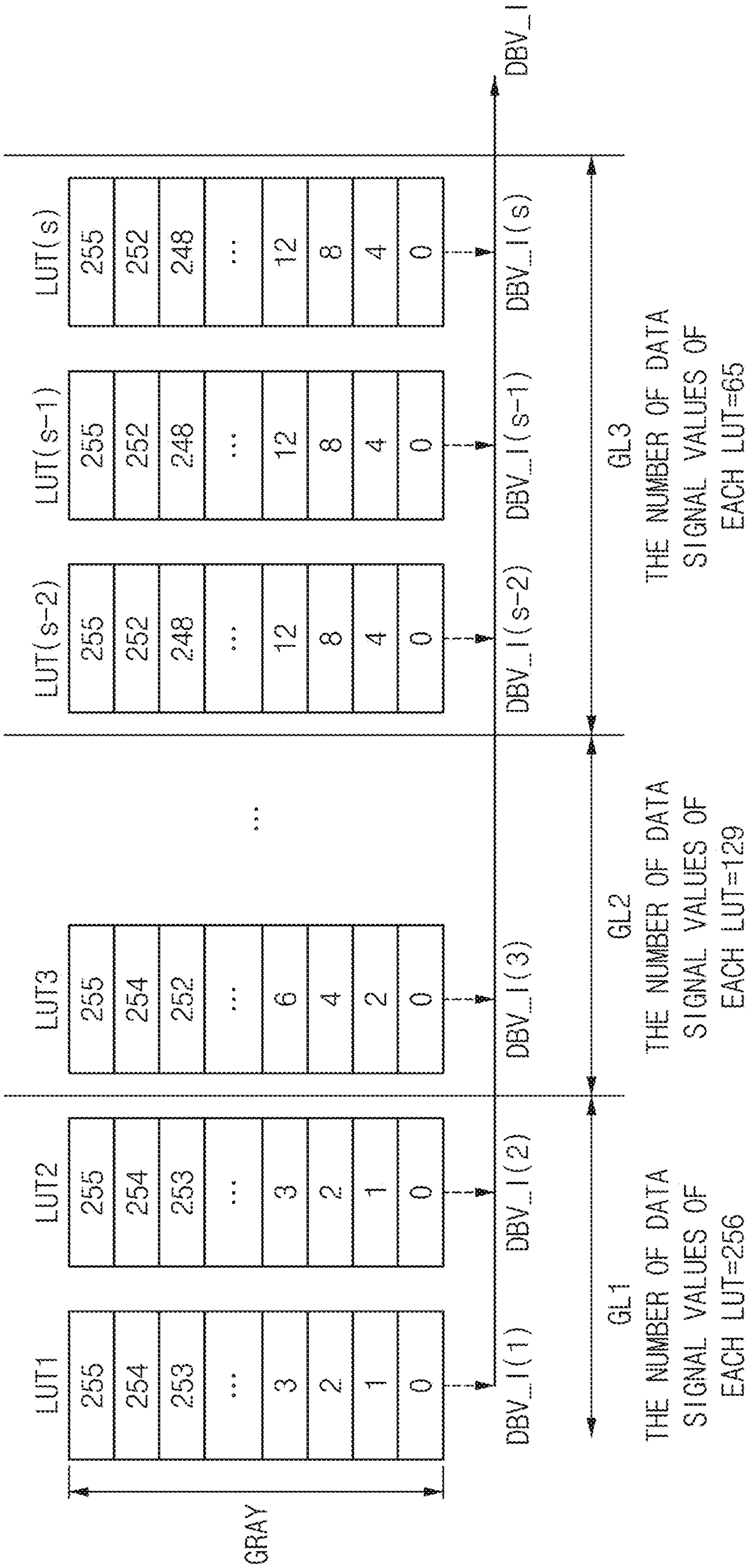
FIG. 8 is a diagram illustrating an example in which the lookup tables of FIG. 4 are divided into a first luminance group, a second luminance group, and a third luminance group.

FIG. 8 is a diagram illustrating an example in which the lookup tables of FIG. 4 are divided into a first luminance group, a second luminance group, and a third luminance group.

Referring to FIG. 8, the driving controller 200 may include the lookup tables LUT storing the data signal values DATA corresponding to the grayscale values of the input image data IMG based on the input maximum luminance DBV_I.

The number of the data signal values DATA stored in the lookup tables LUT corresponding to the input maximum luminance may be different from each other. For example, the number of the data signal values DATA stored in the first lookup table corresponding to the first input maximum luminance may be different from the number of the data signal values DATA stored in the second lookup table corresponding to the second input maximum luminance.

For example, the lookup tables LUT may be divided into a first luminance group GL1, a second luminance group GL2, and a third luminance group GL3 according to the input maximum luminance DBV_I.

The input maximum luminance DBV_I of the first luminance group GL1 may be smaller than the input maximum luminance DBV_I of the second luminance group GL2. The input maximum luminance DBV_I of the second luminance group GL2 may be smaller than the input maximum luminance DBV_I of the third luminance group GL3.

Each of lookup tables LUT of one of the first luminance group GL1, the second luminance group GL2, and the third luminance group GL3 may have the different number of the data signal values DATA from each of lookup tables LUT of another of the first luminance group GL1, the second luminance group GL2, and the third luminance group GL3.

In an embodiment, each of the lookup tables LUT of the first luminance group GL1 may have the greater number of data signal values DATA than each of the lookup tables LUT of the second luminance group GL2, and each of the lookup tables LUT of the second luminance group GL2 may have the greater number of data signal values than each of the lookup tables LUT of the third luminance group GL3.

Specifically, when the input maximum luminance DBV_I is low or when the input image data IMG is a low grayscale, the user may easily recognize an error in luminance. In order to solve the above problem, each of the lookup tables LUT of the first luminance group GL1 may have the greatest number of data signal values DATA since the first luminance group GL1 has the lowest input maximum luminance DBV_I. When the number of the stored data signal values DATA is large, even though the input image data IMG has a low grayscale, the low-grayscale image may be expressed with a small error in luminance. Since the second luminance group GL2 has a higher input maximum luminance DBV_I than the first luminance group GL1, the number of data signal values DATA in each of the lookup tables LUT of the second luminance group GL2 may be smaller than the number of data signal values DATA in each of the first luminance group GL1. Since the third luminance group GL3 has the highest input maximum luminance DBV_I, each of the lookup tables LUT of the third luminance group GL3 may have the smallest number of data signal values DATA.

For example, the grayscale value of the input image data IMG may have 256 grayscales (grayscales 0 to 255). Each of the lookup tables LUT of the first luminance group GL1 may have 256 data signal values DATA. For example, each of the lookup tables LUT of the second luminance group GL2 may have 129 data signal values DATA. In other words, in the second luminance group GL2, the lookup table LUT may have data signal values DATA for grayscales, which are multiples of 2, and have a data signal value DATA for grayscale 255, which is the maximum grayscale. For example, each of the lookup tables LUT of the third luminance group GL3 may have 65 data signal values DATA. In other words, in the third luminance group GL3, the lookup table LUT may have data signal values DATA for grayscales, which are multiples of 4, and have a data signal value DATA for grayscale 255, which is the maximum grayscale.

Accordingly, when the number of data signal values DATA stored in each of lookup tables of one of the first luminance group GL1, the second luminance group GL2, and the third luminance group GL3 is different from the number of data signal values DATA stored in each of lookup tables LUT of another of the first luminance group GL1, the second luminance group GL2, and the third luminance group GL3, an error in luminance may be reduced even when the input maximum luminance DBV_I or the grayscale of the input image data IMG is small. In addition, the weight of a storage space may be varied according to the first luminance group GL1, the second luminance group GL2, and the third luminance group GL3, so that the error in luminance may be reduced without increasing the area and the power consumption of the display panel driver 600.

In an embodiment, each of the lookup tables LUT of the first luminance group GL1 may have more data signal values DATA than each of the lookup tables LUT of the second luminance group GL2 and the third luminance group GL3.

Specifically, When the input maximum luminance DBV_I is low or when the input image data IMG is a low grayscale, the user may easily recognize the error in luminance. In order to solve the above problem, each of the lookup tables LUT of the first luminance group GL1 may have more data signal values DATA than each of the lookup tables LUT of the second luminance group GL2 and the third luminance group GL3 since the first luminance group GL1 has a lower input maximum luminance DBV_I than the second luminance group GL2 and the third luminance group GL3. When the number of stored data signal values DATA is large even though the input image data IMG has a low grayscale, the low-grayscale image may be expressed with a small error in luminance. Since the second luminance group GL2 and the third luminance group GL3 have higher input maximum luminance DBV_I than the first luminance group GL1, each of the lookup tables LUT of the second luminance group GL2 and the third luminance group GL3 may have the smaller number of data signal values DATA than each of the lookup tables LUT of the first luminance group GL1

For example, the grayscale value of the input image data IMG may have 256 grayscales (grayscales 0 to 255). For example, each of the lookup tables LUT of the first luminance group GL1 may have 256 data signal values DATA. For example, each of the lookup tables LUT of the second luminance group GL2 and the third luminance group GL3 may have 129 data signal values DATA.

Although FIG. 8 represents that the first luminance group GL1 includes lookup tables LUT corresponding to a first input maximum luminance DBV_I(1) and a second input maximum luminance DBV_I(2), the second luminance group GL2 includes lookup tables LUT corresponding to a third input maximum luminance DBV_I(3) to an s-3th input maximum luminance DBV_I(s-3), and the third luminance group GL3 includes lookup tables LUT corresponding to an s-2th input maximum luminance DBV_I(s-2) to an s-th input maximum luminance DBV_I(s), FIG. 8 is merely one example. The number of lookup tables LUT of the first luminance group GL1, the second luminance group GL2, and the third luminance group GL3 may be freely changeable, and the present invention is not limited to the case of FIG. 8.

Accordingly, when the number of data signal values DATA stored in each of lookup tables of one of the first luminance group GL1, the second luminance group GL2, and the third luminance group GL3 is different from the number of data signal values DATA stored in each of lookup tables LUT of another of the first luminance group GL1, the second luminance group GL2, and the third luminance group GL3, an error in luminance may be reduced even when the input maximum luminance DBV_I or the grayscale of the input image data IMG is small. In addition, the error in luminance may be reduced without increasing the area and the power consumption of the display panel driver 600 by varying the weight of a storage space according to the first luminance group GL1, the second luminance group GL2, and the third luminance group GL3.

Figure 9:
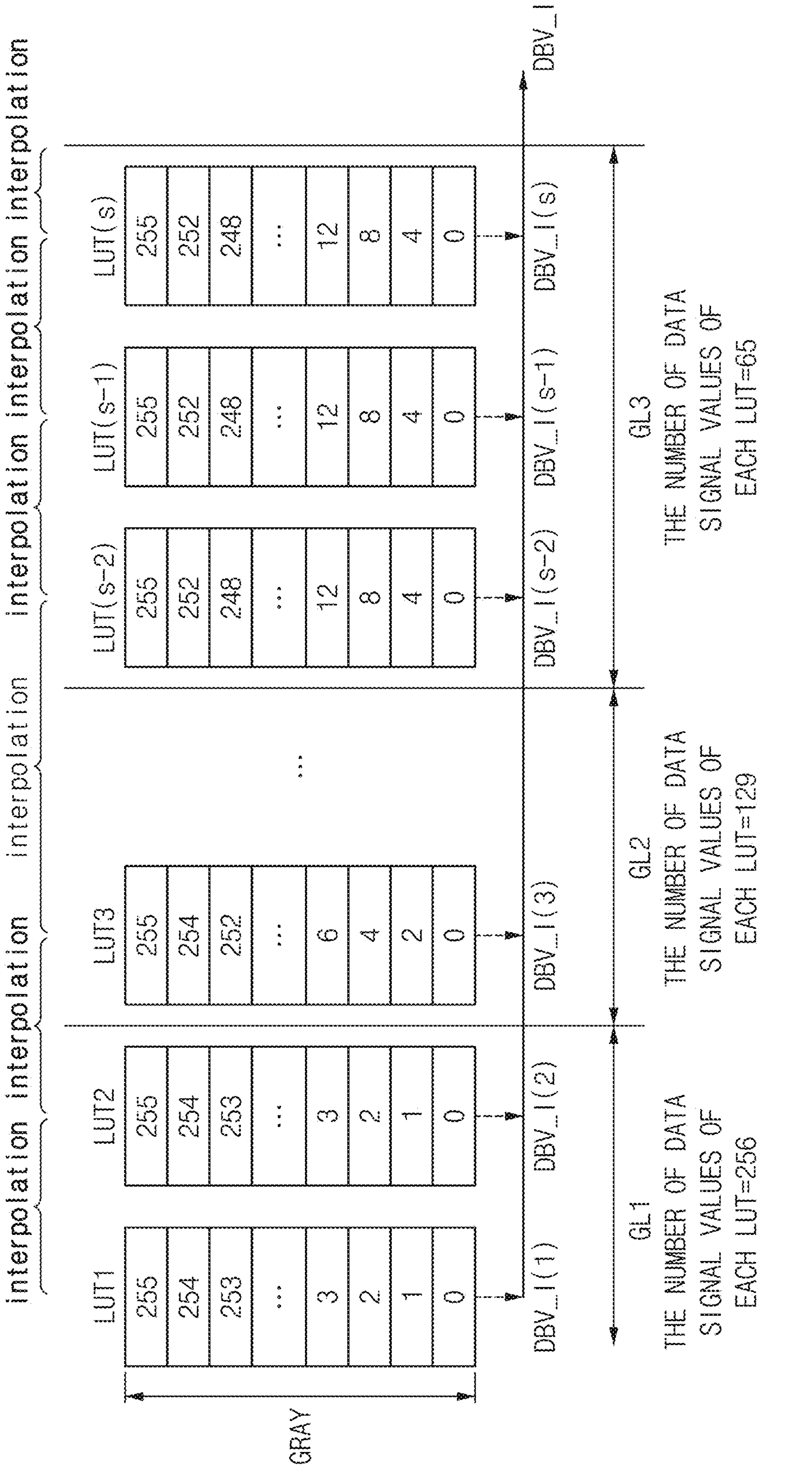
FIG. 9 is a diagram illustrating an example in which the data signal values of the lookup tables of FIG. 8 are linearly interpolated.

FIG. 9 is a diagram illustrating an example in which the data signal values of the lookup tables of FIG. 8 are linearly interpolated.

Referring to FIG. 9, the lookup table LUT corresponding to the input maximum luminance DBV_I is not present. The driving controller 200 may generate a compensation lookup table by linearly interpolating data signal values DATA stored in two lookup tables LUT among lookup tables LUT.

Specifically, when the lookup table LUT corresponding to the input maximum luminance DBV_I is not present, the driving controller 200 may generate the compensation lookup table by selecting two lookup tables LUT adjacent to the input maximum luminance DBV_I, and linearly interpolating the data signal values DATA stored in the two lookup tables LUT. The compensation lookup table may have the same number (e.g., 256) of data signal values DATA as each of the two lookup tables LUT.

Accordingly, when each of the lookup tables of one of the first luminance group GL1, the second luminance group GL2, and the third luminance group GL3 has the different number of data signal values DATA from the number of data signal values DATA stored in each of lookup tables LUT of another of the first luminance group GL1, the second luminance group GL2, and the third luminance group GL3 and is linearly interpolated, an error in luminance may be reduced even when the input maximum luminance DBV_I or the grayscale of the input image data IMG is small. In addition, the area and the power consumption of the display panel driver 600 may be reduced.

Figure 10:
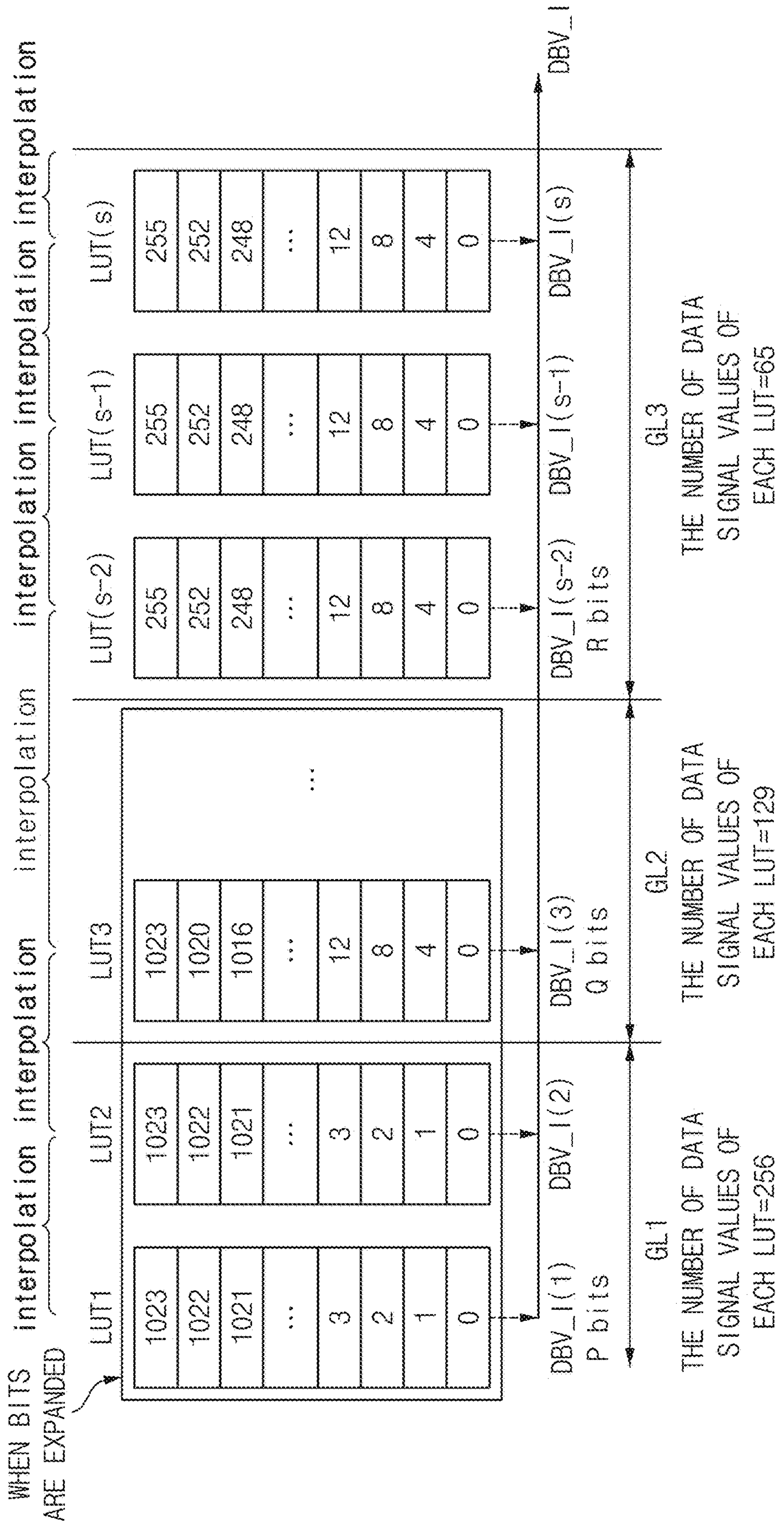
FIG. 10 is a diagram illustrating an example in which the lookup tables of FIG. 8 are stored with modified bits.

FIG. 10 is a diagram illustrating an example in which the lookup tables of FIG. 8 are stored with modified bits.

Referring to FIG. 10, each of grayscale values stored in each of the lookup tables LUT of the first luminance group GL1 may be represented by P bits, each of grayscale values stored in each of the lookup tables LUT of the second luminance group GL2 may be represented by Q bits, and each of grayscale values stored in each of the lookup tables LUT of the third luminance group GL3 may be represented by R bits.

When the input maximum luminance DBV_I is low or when the input image data IMG is a low grayscale, the user may easily recognize an error in luminance. In order to solve the above problem, at least two of the P bits, Q bits, and R bits may be different from each other.

In an embodiment, the P bits may be greater than the R bits and the Q bits may be greater than the R bits.

Specifically, since the first luminance group GL1 and the second luminance group GL2 have lower input maximum luminance DBV_I than the third luminance group GL3, each of grayscale values of each of the lookup tables LUT of the first luminance group GL1 and each of grayscale values of each of the lookup tables LUT of the second luminance group GL2 may be represented by P bits and Q bits greater than R bits, respectively.

For example, the grayscale value of the input image data IMG may have 256 grayscales (grayscales 0 to 255). Since the first luminance group GL1 and the second luminance group GL2 have lower input maximum luminance DBV_I than the third luminance group GL3, the grayscale value of each of the lookup tables LUT of the first luminance group GL1 and the second luminance group GL2 may be represented by 10 bits to have 1024 grayscales (grayscales 0 to 1023). Since the third luminance group GL3 has the input maximum luminance DBV_I greater than the first luminance group GL1 and the second luminance group GL2, the grayscale value of each of the lookup tables LUT of the third luminance group GL3 may be represented by 8 bits less than 10 bits to have 256 grayscales (grayscales 0 to 255).

Accordingly, when the number of data signal values DATA stored in each of the lookup tables of one of the first luminance group GL1, the second luminance group GL2, and the third luminance group GL3 is different from the number of data signal values DATA stored in each of lookup tables LUT of another of the first luminance group GL1, the second luminance group GL2, and the third luminance group GL3, and when the bits of the grayscale values of each of the lookup tables LUT are different, an error in luminance may be reduced even when the input maximum luminance DBV_I or the grayscale of the input image data IMG is small. In addition, the error in luminance may be reduced without increasing the area and the power consumption of the display panel driver 600 by varying the weight of a storage space according to the first luminance group GL1, the second luminance group GL2, and the third luminance group GL3.

In an embodiment, the P bits may be greater than the Q bits and the P bits may be greater than R bits.

Specifically, since the first luminance group GL1 has the lowest input maximum luminance DBV_I, each of grayscale values of each of the lookup tables LUT of the first luminance group GL1 may be represented by P bits and may be the greatest. Since the second luminance group GL2 and the third luminance group GL3 each have greater input maximum luminance DBV_I than the first luminance group GL1, the Q bits and the R bits may each be smaller than the P bits.

For example, the grayscale value of the input image data IMG may have 256 grayscales (grayscales 0 to 255). Since the first luminance group GL1 has a lower input maximum luminance DBV_I than each of the second luminance group GL2 and the third luminance group GL3, The grayscale values of each of the lookup tables LUT of the first luminance group GL1 may be represented by 10 bits, to have 1024 grayscales (grayscales 0 to 1023). Since the second luminance group GL2 and the third luminance group GL3 each have greater input maximum luminance DBV_I than the first luminance group GL1, The grayscale values of each of the lookup tables LUT of the second luminance group GL2 and the third luminance group GL3 may be represented by 8 bits less than 10 bits to have 256 grayscales (grayscales 0 to 255).

Accordingly, when the number of data signal values DATA stored in each of the lookup tables of one of the first luminance group GL1, the second luminance group GL2, and the third luminance group GL3 is different from the number of data signal values DATA stored in each of lookup tables LUT of another of the first luminance group GL1, the second luminance group GL2, and the third luminance group GL3, and when the bits of the grayscale values of each of the lookup tables LUT are different, an error in luminance may be reduced even when the input maximum luminance DBV_I or the grayscale of the input image data IMG is small. In addition, the error in luminance may be reduced without increasing the area and the power consumption of the display panel driver 600 by varying the weight of a storage space according to the first luminance group GL1, the second luminance group GL2, and the third luminance group GL3.

Figure 11:
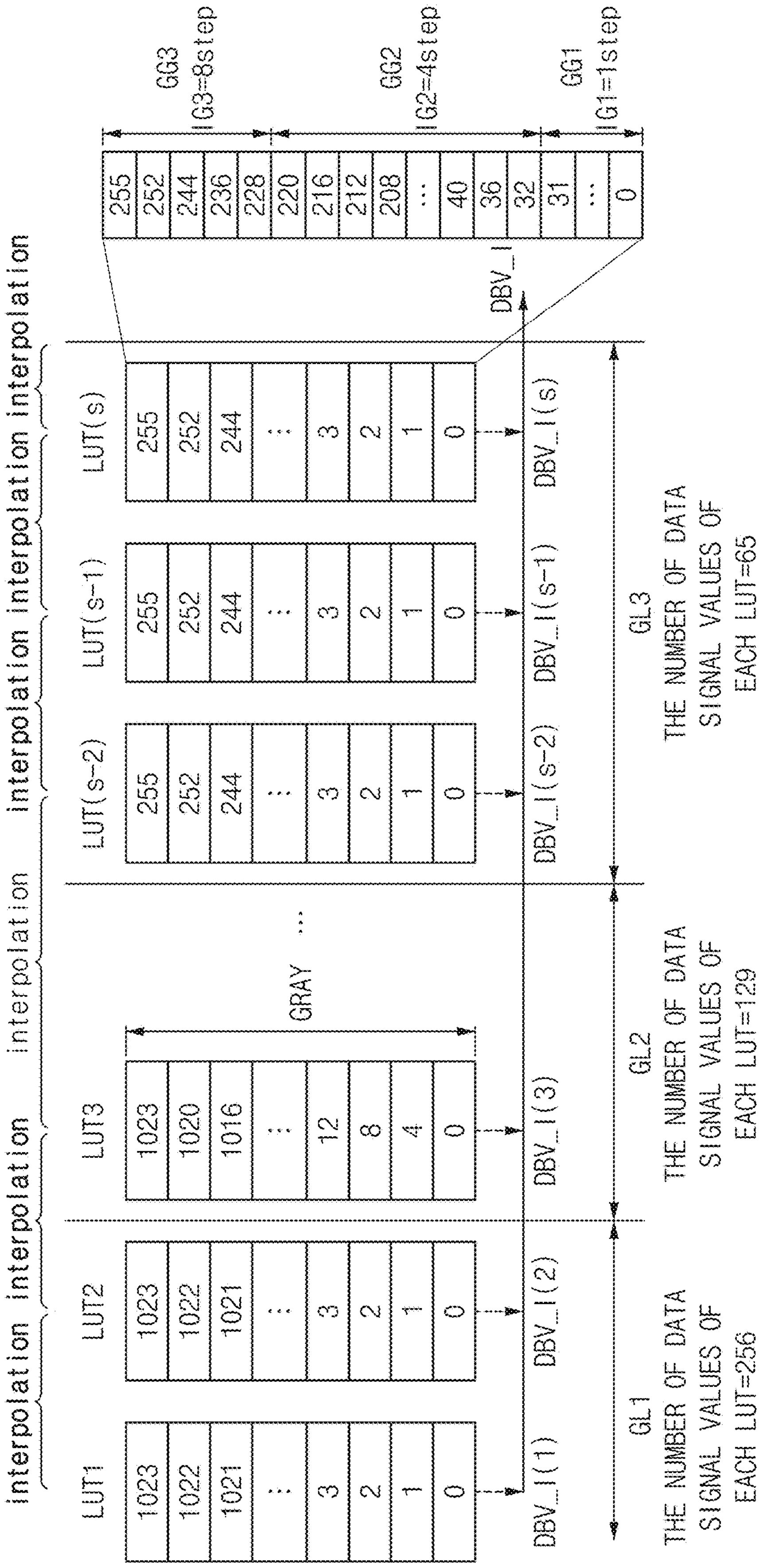
FIG. 11 is a diagram illustrating an example in which each of the lookup tables of the third luminance group of FIG. 8 is divided into a first grayscale group, a second grayscale group, and a third grayscale group.

FIG. 11 is a diagram illustrating an example in which each of the lookup tables of the third luminance group of FIG. 8 is divided into a first grayscale group, a second grayscale group, and a third grayscale group.

Referring to FIG. 11, each of the lookup tables LUT of the third luminance group GL3 may be divided into a first grayscale group GG1 at a first grayscale interval IG1, a second grayscale group GG2 at a second grayscale interval IG2, and a third grayscale group GG3 at a third grayscale interval IG3 according to the grayscale of the input image data IMG.

When the input maximum luminance DBV_I is low or when the input image data IMG is a low grayscale, the user may easily recognize an error in luminance. In order to solve the above problem, at least two of the first grayscale interval IG1, the second grayscale interval IG2, and the third grayscale interval IG3 may be different from each other. The grayscale of the first grayscale group GG1 may be smaller than that of the second grayscale group GG2, and the grayscale of the second grayscale group GG2 may be smaller than that of the third grayscale group GG3.

In an embodiment, the first grayscale interval IG1 may be smaller than the second grayscale interval IG2, and the second grayscale interval IG2 may be smaller than the third grayscale interval IG3.

Specifically, since the grayscale of the first grayscale group GG1 is the lowest, the first grayscale interval IG1 may be the smallest. Since the second grayscale group GG2 has a higher grayscale than the first grayscale group GG1, the second grayscale interval IG2 may be greater than the first grayscale interval IG1. Since the grayscale of the third grayscale group GG3 is the highest, the third grayscale interval IG3 may be the greatest. For example, as shown in FIG. 11, the first grayscale interval IG1 may be grayscale 1, the second grayscale interval IG2 may be grayscale 4, and the third grayscale interval IG3 may be grayscale 8.

FIG. 11 illustrates that each of the lookup tables LUT of the third luminance group GL3 is divided into the first grayscale group GG1 at the first grayscale interval IG1 as 1 step, the second grayscale group GG2 at the second grayscale interval IG2 as 4 step, and the third grayscale group GG3 at the third grayscale interval IG3 as 8 steps. However, FIG. 11 is merely one example, the first grayscale interval IG1, the second grayscale interval IG2, and the third grayscale interval IG3 may be freely changeable, and the present invention is not limited to the case of FIG. 11.

Accordingly, when the number of data signal values DATA stored in each of the lookup tables of one of the first luminance group GL1, the second luminance group GL2, and the third luminance group GL3 is different from the number of data signal values DATA stored in each of lookup tables LUT of another of the first luminance group GL1, the second luminance group GL2, and the third luminance group GL3, and when each of the lookup tables LUT has a different grayscale interval according to the grayscale, an error in luminance may be reduced even when the input maximum luminance DBV_I or the grayscale of the input image data IMG is small. In addition, the error in luminance may be reduced without increasing the area and the power consumption of the display panel driver 600 by varying the weight of a storage space according to the first luminance group GL1, the second luminance group GL2, and the third luminance group GL3.

Figure 12:
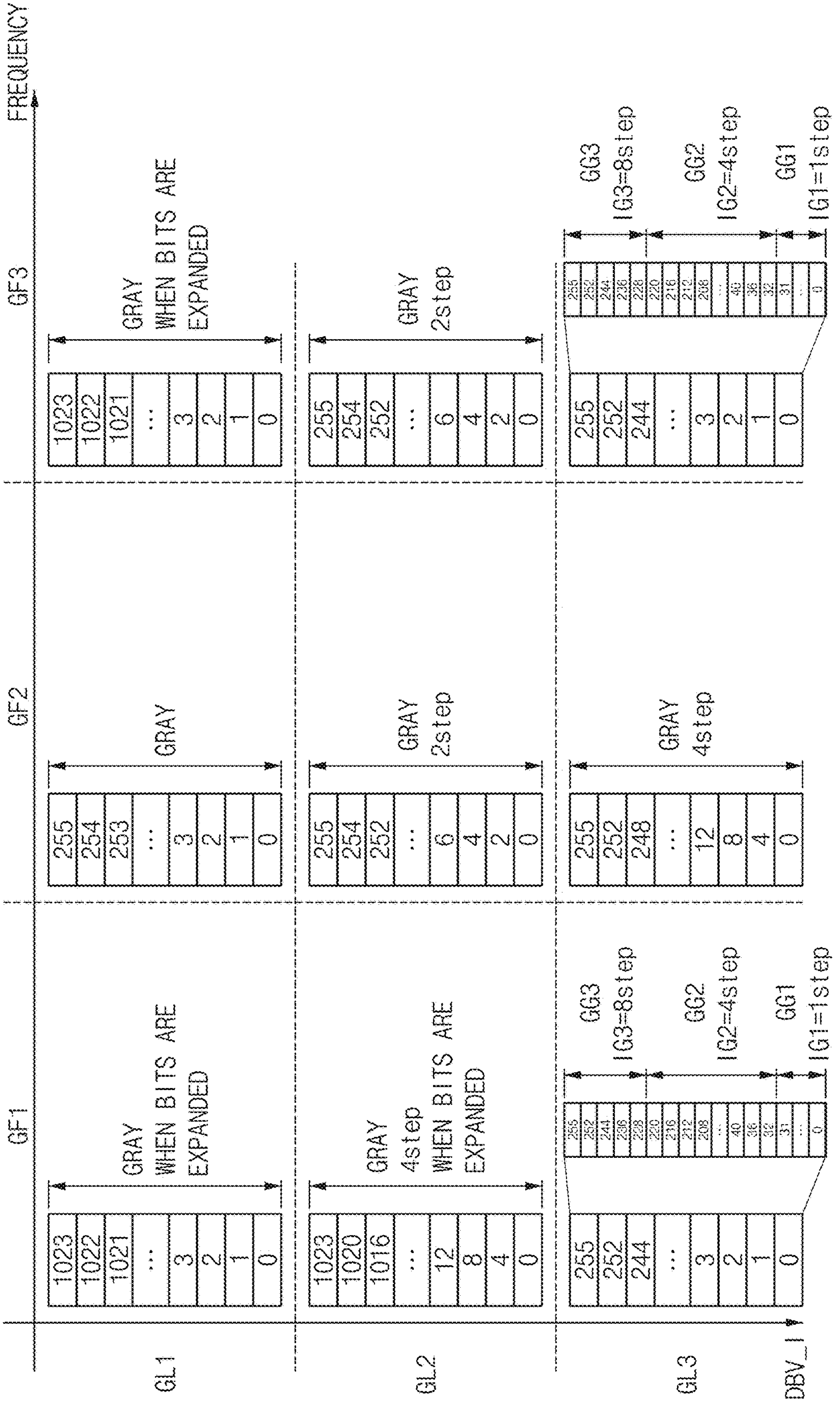
FIG. 12 is a diagram illustrating an example in which the lookup tables are divided into a first frequency group, a second frequency group, and a third frequency group.

FIG. 12 is a diagram illustrating an example in which the lookup tables are divided into a first frequency group, a second frequency group, and a third frequency group.

Referring to FIG. 12, the lookup tables LUT may be divided into a first frequency group GF1, a second frequency group GF2, and a third frequency group GF3 according to a driving frequency for the display panel driver 600. The driving frequency of the first frequency group GF1 may be lower than the driving frequency of the second frequency group GF2, and the driving frequency of the second frequency group GF2 may be lower than the driving frequency of the third frequency group GF3. The number of data signal values DATA stored in one of the first frequency group GF1, the second frequency group GF2, and the third frequency group GF3 may be different from the number of data signal values DATA stored in each of lookup tables LUT of another of the first luminance group GL1, the second luminance group GL2, and the third luminance group GL3.

In an embodiment, each of the lookup tables LUT of the first frequency group GF1 may have the number of data signal values DATA different from each of the lookup tables LUT of the second and third frequency groups GF2 and GF3.

In an embodiment, each of the lookup tables LUT of the second frequency group GF2 may have the number of data signal values DATA different from each of the lookup tables LUT of the first and third frequency groups GF1 and GF3.

In an embodiment, each of the lookup tables LUT of the third frequency group GF3 may have the number of data signal values DATA different from each of the lookup tables LUT of the first and second frequency groups GF1 and GF2.

In addition, the number of the data signal values DATA stored in the lookup tables LUT of FIG. 12 are merely one example, the numbers of the data signal values DATA stored in the lookup tables LUT according to the driving frequency, input maximum luminance and input image data IMG may be freely changed, and the present invention is not limited to the case of FIG. 12.

Figure 13:
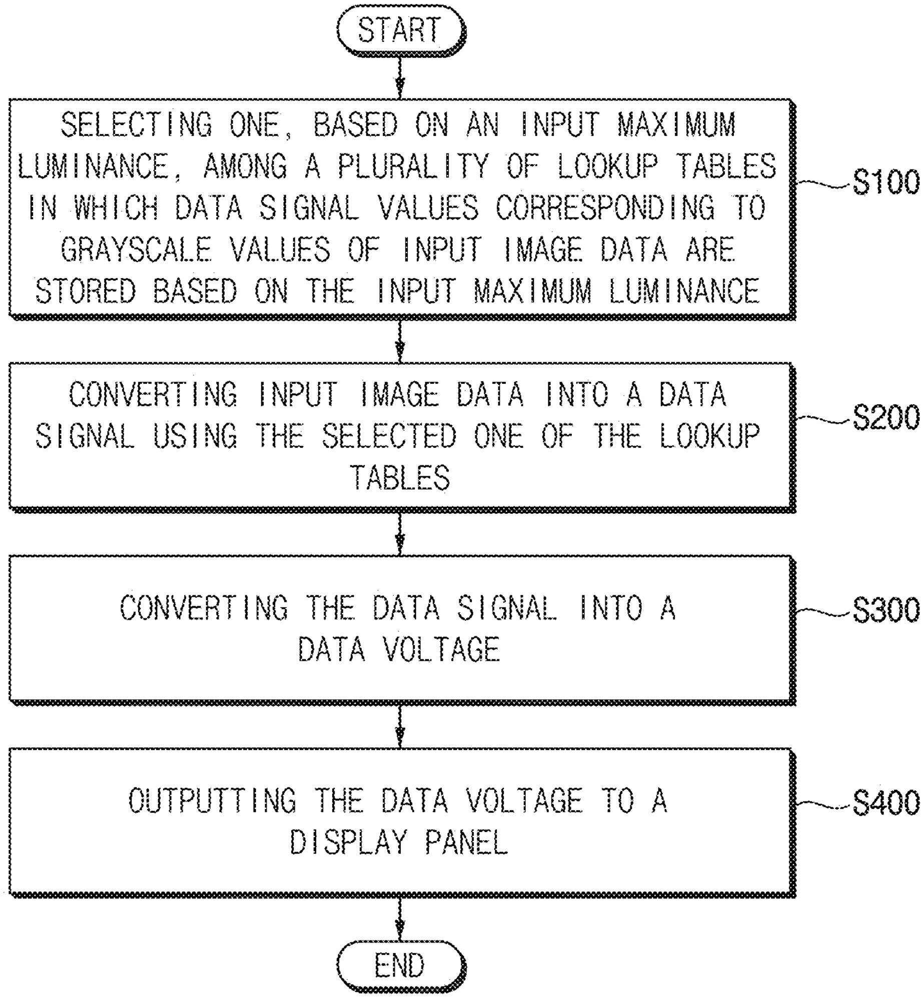
FIG. 13 is a flowchart illustrating a method of driving a display panel using a display panel driver.

FIG. 13 is a flowchart illustrating a method of driving a display panel using a display panel driver.

Referring to FIG. 13, the method of driving a display panel may include selecting one, based on the input maximum luminance DBV_I, among lookup tables LUT in which the data signal values DATA corresponding to the grayscale values of the input image data IMG are stored based on the input maximum luminance DBV_I (S100), converting the input image data IMG into the data signal DATA using the selected one of the lookup tables (S200), converting the data signal DATA into the data voltage VDATA (S300), and outputting the data voltage VDATA to a display panel 100 (S400).

In an embodiment, the number of the data signal values DATA stored in the lookup tables LUT corresponding to the input maximum luminance may be different from each other. For example, the number of data signal values DATA stored in the first lookup table corresponding to the first input maximum luminance may be different from the number of data signal values of the second lookup table corresponding to the second input maximum luminance.

The method of driving the display panel 100 using the display panel driver 600 of FIG. 13 is substantially the same as the display panel driver 600 described with reference to FIGS. 1 to 8. Therefore, redundant descriptions of the same or corresponding components will be omitted.

In an embodiment, the lookup tables LUT may be divided into the first luminance group GL1, the second luminance group GL2, and the third luminance group GL3 according to the input maximum luminance DBV_I. The input maximum luminance DBV_I of the first luminance group GL1 may be lower than the input maximum luminance DBV_I of the second luminance group GL2, and the input maximum luminance DBV_I of the second luminance group GL2 may be lower than the input maximum luminance DBV_I of the third luminance group GL3. each of the lookup tables LUT of the first luminance group GL1 may have the greater number of the data signal values DATA than each of the lookup tables LUT of the second luminance group GL2, and each of the lookup tables LUT of the second luminance group GL2 may have the greater number of the data signal values DATA than each of the lookup tables LUT of the third luminance group GL3.

In an embodiment, the lookup table LUT corresponding to the input maximum luminance DBV_I is not present. The driving controller 200 may generate the compensation lookup table by linearly interpolating data signal values DATA stored in two lookup tables LUT among the lookup tables LUT.

In an embodiment, the lookup tables LUT may be divided into the first luminance group GL1, the second luminance group GL2, and the third luminance group GL3 according to the input maximum luminance DBV_I. The input maximum luminance DBV_I of the first luminance group GL1 may be lower than the input maximum luminance DBV_I of the second luminance group GL2, and the input maximum luminance DBV_I of the second luminance group GL2 may be lower than the input maximum luminance DBV_I of the third luminance group GL3. Each of grayscale values of each of the lookup tables LUT of the first luminance group GL1 may be represented by P bits, each of grayscale values of each of the lookup tables LUT of the second luminance group GL2 may be represented by Q bits, and each of grayscale values of each of the lookup tables LUT of the third luminance group GL3 may be represented by R bits. At least two of the P bits, Q bits, and R bits may be different from each other.

In an embodiment, each of the lookup tables LUT may be divided into the first grayscale group GG1 at the first grayscale interval IG1, the second grayscale group GG2 at the second grayscale interval IG2, and the third grayscale group GG3 at the third grayscale interval IG3 according to the grayscale of the input image data IMG. At least two of the first grayscale interval IG1, the second grayscale interval IG2, and the third grayscale interval IG3 may be different from each other.

In an embodiment, the lookup tables LUT may be divided into the first frequency group GF1, the second frequency group GF2, and the third frequency group GF3 according to the driving frequency. The driving frequency of the first frequency group GF1 may be lower than the driving frequency of the second frequency group GF2, and the driving frequency of the second frequency group GF2 may be lower than the driving frequency of the third frequency group GF3. The number of data signal values DATA stored in at least two of the first frequency group GF1, the second frequency group GF2, and the third frequency group GF3 may be different from the number of data signal values DATA stored in each of lookup tables LUT of another of the first luminance group GL1, the second luminance group GL2, and the third luminance group GL3.

Figure 14:
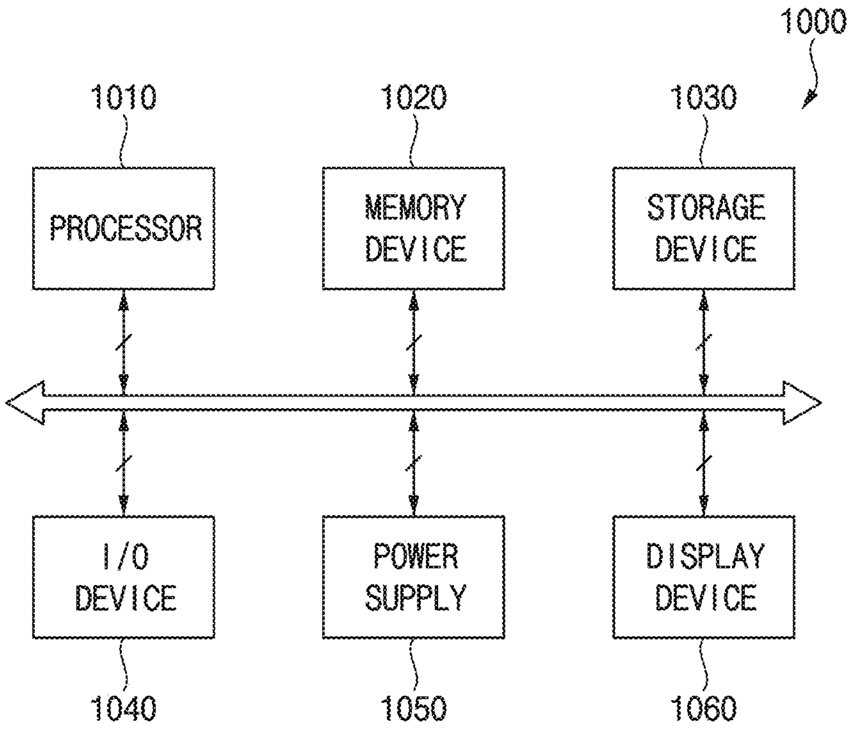
FIG. 14 is a block diagram illustrating an electronic device 1000 according to embodiment of the present invention.
Figure 15:
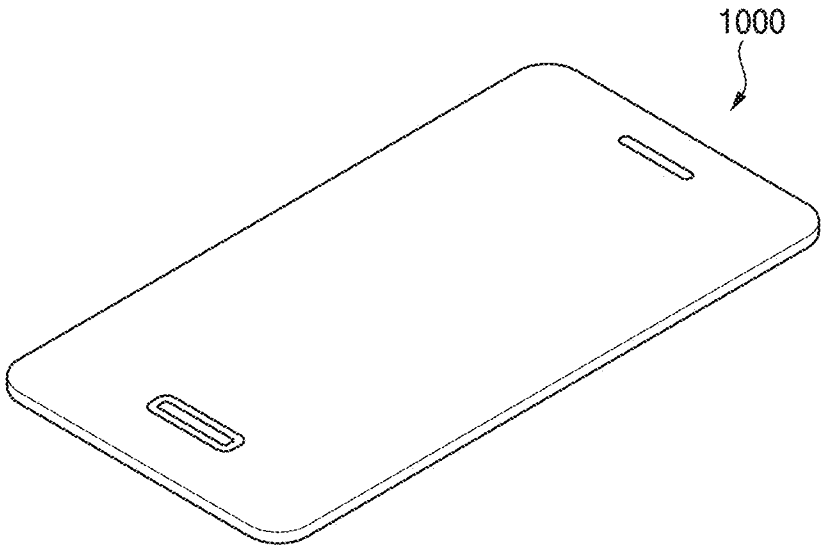
FIG. 15 is a diagram illustrating an example in which the electronic device 1000 of FIG. 14 is implemented as a smart phone.

FIG. 14 is a block diagram illustrating an electronic device 1000 according to embodiment of the present invention. FIG. 15 is a diagram illustrating an example in which the electronic device 1000 of FIG. 14 is implemented as a smart phone.

Referring to FIGS. 14 and 15, the electronic device 1000 may include a processor 1010, a memory device 1020, a storage device 1030, an input/output ("I/O") device 1040, a power supply 1050, and a display device 1060. The display device 1060 may be the display device 10 of FIG. 1. In addition, the electronic device 1000 may further include a plurality of ports for communicating with a video card, a sound card, a memory card, a universal serial bus ("USB") device, other electronic device, or the like.

In an embodiment, as illustrated in FIG. 15, the electronic device 1000 may be implemented as a smart phone. However, the electronic device 1000 is not limited thereto. For another example, the electronic device 1000 may be implemented as a cellular phone, a video phone, a smart pad, a smart watch, a tablet PC, a car navigation system, a computer monitor, a laptop, a head mounted display ("HMD") device, or the like.

The processor 1010 may perform various computing functions. The processor 1010 may be a micro processor, a central processing unit ("CPU"), an application processor ("AP"), or the like. The processor 1010 may be coupled to other components via an address bus, a control bus, a data bus, or the like. Further, the processor 1010 may be coupled to an extended bus such as a peripheral component interconnection ("PCI") bus.

The memory device 1020 may store data for operations of the electronic device 1000. For example, the memory device 1020 may include at least one non-volatile memory device such as an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device, and the like and/or at least one volatile memory device such as a dynamic random access memory ("DRAM") device, a static random access memory ("SRAM") device, a mobile DRAM device, and the like.

The storage device 1030 may include a solid state drive ("SSD") device, a hard disk drive ("HDD") device, a CD-ROM device, or the like.

The I/O device 1040 may include an input device such as a keyboard, a keypad, a mouse device, a touch-pad, a touch-screen, or the like, and an output device such as a printer, a speaker, and the like. In some embodiments, the I/O device 1040 may include the display device 1060.

The power supply 1050 may provide power for operations of the electronic device 1000.

The display device 1060 may be connected to other components through buses or other communication links.

The present inventions may be applied to any display device and any electronic device including the touch panel. For example, the inventions may be applied to a mobile phone, a smart phone, a tablet computer, a digital television ("TV"), a 3D TV, a personal computer ("PC"), a home appliance, a laptop computer, a personal digital assistant ("PDA"), a portable multimedia player ("PMP"), a digital camera, a music player, a portable game console, a navigation device, etc.

The foregoing is illustrative of the present invention and is not to be construed as limiting thereof. Although a few exemplary embodiments of the present invention have been described, those skilled in the art will readily appreciate that many modifications are possible in the exemplary embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific exemplary embodiments disclosed, and that modifications to the disclosed exemplary embodiments, as well as other exemplary embodiments, are intended to be included within the scope of the appended claims. The present invention is defined by the following claims, with equivalents of the claims to be included therein.

What is claimed is:

1. A display panel driver comprising:

a driving controller configured to receive input image data and to convert the input image data into a data signal; and a data driver configured to convert the data signal into a data voltage, wherein the driving controller includes a plurality of lookup tables storing data signal values corresponding to grayscale values of the input image data based on an input maximum luminance, and a total number of the data signal values stored in a first lookup table corresponding to a first input maximum luminance is different from a total number of the data signal values stored in a second lookup table corresponding to a second input maximum luminance.

2. The display panel driver of claim 1, wherein the lookup tables are divided into a first luminance group, a second luminance group, and a third luminance group according to the input maximum luminance, the input maximum luminance of the first luminance group is lower than the input maximum luminance of the second luminance group, and the input maximum luminance of the second luminance group is lower than the input maximum luminance of the third luminance group, each of the lookup tables of the first luminance group has a greater number of the data signal values than each of the lookup tables of the second luminance group, and each of the lookup tables of the second luminance group has a greater number of the data signal values than each of the lookup tables of the third luminance group.

3. The display panel driver of claim 1, wherein the lookup tables are divided into a first luminance group, a second luminance group, and a third luminance group according to the input maximum luminance, the input maximum luminance of the first luminance group is lower than the input maximum luminance of the second luminance group, and the input maximum luminance of the second luminance group is lower than the input maximum luminance of the third luminance group, and each of the lookup tables of the first luminance group has a greater number of the data signal values than each of the lookup tables of the second luminance group and the third luminance group.

4. The display panel driver of claim 1, wherein the input maximum luminance is manually set by a user or automatically set using an illuminance sensor.

5. The display panel driver of claim 1, wherein, when a certain lookup table corresponding to the input maximum luminance is absent from the driving controller, the driving controller generates a compensation lookup table corresponding to the certain lookup table by linearly interpolating the data signal values stored in two lookup tables adjacent to the input maximum luminance among the lookup tables.

6. The display panel driver of claim 1, wherein the lookup tables are divided into a first luminance group, a second luminance group, and a third luminance group according to the input maximum luminance, the input maximum luminance of the first luminance group is lower than the input maximum luminance of the second luminance group, and the input maximum luminance of the second luminance group is lower than the input maximum luminance of the third luminance group, each of grayscale values of each of the lookup tables of the first luminance group are represented by P bits, each of grayscale values of each of the lookup tables of the second luminance group are represented by Q bits, each of grayscale values of each of the lookup tables of the third luminance group are represented by R bits, P, Q, and R are natural numbers, and at least two of the P bits, the Q bits, and the R bits are different from each other.

7. The display panel driver of claim 6, wherein the P bits are greater than the R bits, and the Q bits are greater than the R bits.

8. The display panel driver of claim 6, wherein the P bits are greater than the Q bits, and the P bits are greater than the R bits.

9. The display panel driver of claim 1, wherein each of the lookup tables is divided into a first grayscale group having a first grayscale interval, a second grayscale group having a second grayscale interval, and a third grayscale group having a third grayscale interval according to the grayscale values of the input image data, and at least two of the first grayscale interval, the second grayscale interval, and the third grayscale interval are different from each other.

10. The display panel driver of claim 9, wherein each of grayscale values of the second grayscale group is greater than each of grayscale values of the first grayscale group, and each of grayscale values of the third grayscale group is greater than each of the grayscale values of the second grayscale group, and the first grayscale interval is smaller than the second grayscale interval, and the second grayscale interval is smaller than the third grayscale interval.

11. The display panel driver of claim 1, wherein the lookup tables are divided into a first frequency group, a second frequency group, and a third frequency group according to a driving frequency for the display panel driver, the driving frequency of the first frequency group is smaller than the driving frequency of the second frequency group, the driving frequency of the second frequency group is smaller than the driving frequency of the third frequency group, and numbers of the data signal values of at least two of the first frequency group, the second frequency group, and the third frequency group are different from each other.

12. The display panel driver of claim 11, wherein each of the lookup tables of the first frequency group has a total number of the data signal values different from a total number of the data signal values of each of the lookup tables of the second frequency group and the third frequency group.

13. The display panel driver of claim 11, wherein each of the lookup tables of the second frequency group has a total number of the data signal values different from a total number of the data signal values of each of the lookup tables of the first frequency group and the third frequency group.

14. The display panel driver of claim 11, wherein each of the lookup tables of the third frequency group has a total number of the data signal values different from a total number of the data signal values of each of the lookup tables of the first frequency group and the second frequency group.

15. A method of operating a display panel, the method comprising:

selecting one, based on an input maximum luminance, among a plurality of lookup tables in which data signal values corresponding to grayscale values of input image data are stored based on the input maximum luminance;

converting the input image data into a data signal using the selected one of the lookup tables;

converting the data signal into a data voltage; and outputting the data voltage to a display panel, wherein a total number of the data signal values of a first lookup table corresponding to a first input maximum luminance is different from a total number of the data signal values of a second lookup table corresponding to a second input maximum luminance.

16. The method of claim 15, wherein the lookup tables are divided into a first luminance group, a second luminance group, and a third luminance group according to the input maximum luminance, the input maximum luminance of the first luminance group is lower than the input maximum luminance of the second luminance group, and the input maximum luminance of the second luminance group is lower than the input maximum luminance of the third luminance group, each of the lookup tables of the first luminance group has a greater number of the data signal values than each of the lookup tables of the second luminance group, and each of the lookup tables of the second luminance group has a greater number of the data signal values than each of the lookup tables of the third luminance group.

17. The method of claim 15, wherein, when a certain lookup table corresponding to the input maximum luminance is absent from the driving controller, the driving controller generates a compensation lookup table corresponding to the certain lookup table by linearly interpolating the data signal values stored in two lookup tables adjacent to the input maximum luminance among the lookup tables.

18. The method of claim 15, wherein the lookup tables are divided into a first luminance group, a second luminance group, and a third luminance group according to the input maximum luminance, the input maximum luminance of the first luminance group is lower than the input maximum luminance of the second luminance group, and the input maximum luminance of the second luminance group is lower than the input maximum luminance of the third luminance group, each of grayscale values of each of the lookup tables of the first luminance group are represented by P bits, each of grayscale values of each of the lookup tables of the second luminance group are represented by Q bits, each of grayscale values of each of the lookup tables of the third luminance group are represented by R bits, P, Q, and R are natural numbers, and at least two of the P bits, the Q bits, and the R bits are different from each other.

19. The method of claim 15, wherein each of the lookup tables is divided into a first grayscale group having a first grayscale interval, a second grayscale group having a second grayscale interval, and a third grayscale group having a third grayscale interval according to the grayscale values of the input image data, and at least two of the first grayscale interval, the second grayscale interval, and the third grayscale interval are different from each other.

20. The method of claim 15, wherein the lookup tables are divided into a first frequency group, a second frequency group, and a third frequency group according to a driving frequency for the display panel driver, the driving frequency of the first frequency group is smaller than the driving frequency of the second frequency group, the driving frequency of the second frequency group is smaller than the driving frequency of the third frequency group, and numbers of the data signal values of at least two of the first frequency group, the second frequency group, and the third frequency group are different from each other.

* * * * *